(12) United States Patent
Sadahiro

(10) Patent No.: US 10,969,318 B2
(45) Date of Patent: Apr. 6, 2021

(54) HARDNESS TESTER AND PROGRAM

(71) Applicant: MITUTOYO CORPORATION, Kanagawa (JP)

(72) Inventor: Shinichi Sadahiro, Hokkaido (JP)

(73) Assignee: MITUTOYO CORPORATION, Kanagawa (JP)

(*) Notice: Subject to any disclaimer, the term of this patent is extended or adjusted under 35 U.S.C. 154(b) by 291 days.

(21) Appl. No.: 16/173,231

(22) Filed: Oct. 29, 2018

(65) Prior Publication Data
US 2019/0128787 A1 May 2, 2019

(30) Foreign Application Priority Data
Oct. 30, 2017 (JP) .............................. JP2017-209201

(51) Int. Cl.
*G01N 3/42* (2006.01)
*G01N 3/06* (2006.01)

(52) U.S. Cl.
CPC ............... *G01N 3/42* (2013.01); *G01N 3/068* (2013.01); *G01N 2203/008* (2013.01); *G01N 2203/0647* (2013.01); *G01N 2203/0682* (2013.01)

(58) Field of Classification Search
CPC .. G01N 3/42; G01N 3/068; G01N 2203/0682; G01N 2203/008; G01N 2203/0647
See application file for complete search history.

(56) References Cited

U.S. PATENT DOCUMENTS

| 4,627,096 A | * | 12/1986 | Grattoni | ............... G01B 11/024 348/128 |
| 9,003,871 B2 | | 4/2015 | Sadahiro | |
| 9,146,185 B2 | | 9/2015 | Sadahiro | |
| 2013/0125631 A1 | * | 5/2013 | Sadahiro | .................. G01N 3/42 73/81 |
| 2014/0177937 A1 | * | 6/2014 | Ariga | ..................... G01N 3/068 382/141 |
| 2017/0102305 A1 | | 4/2017 | Tsujii et al. | |
| 2018/0217040 A1 | | 8/2018 | Tsujii et al. | |

FOREIGN PATENT DOCUMENTS

JP         H09-210893 A         8/1997

* cited by examiner

*Primary Examiner* — Eric S. McCall
*Assistant Examiner* — Timothy P Graves
(74) *Attorney, Agent, or Firm* — Greenblum & Bernstein, P.L.C.

(57) ABSTRACT

A hardness tester that loads a predetermined test force and forms an indentation in a surface of a sample using an indenter, and measures the hardness of the sample by measuring dimensions of the indentation includes a CCD camera that acquires an image of the surface of the sample before and after the indentation is formed. The CPU can execute a plurality of indentation region extraction processes that use mutually distinct methods, the indentation region extraction processes each extracting an indentation region based on the images acquired by the CCD camera. The CPU also makes a determination determining whether the indentation region extracted by the plurality of indentation region extraction processes matches a predefined reference indentation region, and based on an indentation region that is determined to match, the CPU calculates the hardness of the sample.

17 Claims, 14 Drawing Sheets

HARDNESS TESTER AND PROGRAM

CROSS-REFERENCE TO RELATED APPLICATIONS

The present application claims priority under 35 U.S.C. § 119 of Japanese Application No. 2017-209201, filed on Oct. 30, 2017, the disclosure of which is expressly incorporated by reference herein in its entirety.

BACKGROUND OF THE INVENTION

1. Field of the Invention

The present invention relates to a hardness tester and a program.

2. Description of Related Art

A conventional hardness tester is known which measures the hardness of a sample based on dimensions of an indentation formed by pressing an indenter against the sample (work piece) with a predetermined test force. For example, a Vickers hardness tester measures a length of diagonal lines of an indentation after the indentation is formed by pressing a square pyramidal indenter into a surface of the sample, and calculates hardness based on the measured length of the diagonal lines of the indentation.

For the hardness tester described above, a technology that measures a position of an apex of an indentation has been proposed that makes extracting an indentation region easier by performing a process (background subtraction process) in which, before forming the indentation in the sample (before impression), an image of the surface of the sample is captured to obtain a background image, and after forming the indentation in the sample (after impression), an image of the surface of the sample is captured to obtain a measurement image, and the background image is subtracted from the measurement image to obtain a difference image (see, for example, Japanese Patent Laid-open Publication No. H09-210893).

However, the technology described in Japanese Patent Laid-open Publication No. H09-210893 uses brightness information without modification, and therefore for a sample where an image that is to be measured has a complex brightness distribution, for example, such as with a sample that has been engraved (etched), a sample that retains a large number of cutting traces, or the like, simply taking a subtraction of the images may not allow accurate extraction of the indentation region.

SUMMARY OF THE INVENTION

The present invention provides a hardness tester and a program capable of extracting an indentation region from a measurement image with a favorable degree of accuracy, and of improving the accuracy of measurement results.

In order to resolve the above-noted issues, a hardness tester according to the present invention is a hardness tester that loads a predetermined test force and forms an indentation in a surface of a sample using an indenter, and measures the hardness of the sample by measuring dimensions of the indentation. The hardness tester includes an image acquirer that acquires an image of the surface of the sample before and after the indentation is formed; a plurality of indentation region extractors that use mutually distinct methods, the indentation region extractors extracting an indentation region based on the images acquired by the image acquirer; a determiner determining whether the indentation region extracted by the plurality of indentation region extractors matches a predefined reference indentation condition; and a hardness calculator calculating the hardness of the sample based on an indentation region that is determined by the determiner to match.

Furthermore, a program according to the present invention is a program causing a computer of a hardness tester that loads a predetermined test force and forms an indentation in a surface of a sample using an indenter, and measures the hardness of the sample by measuring dimensions of the indentation to act as: an image acquirer that acquires an image of the surface of the sample before and after the indentation is formed; a plurality of indentation region extractors that use mutually distinct methods, the indentation region extractors extracting an indentation region based on the images acquired by the image acquirer; a determiner determining whether the indentation region extracted by the plurality of indentation region extractors matches a predefined reference indentation condition; and a hardness calculator calculating the hardness of the sample based on an indentation region that is determined by the determiner to match.

According to the present invention, an indentation region can be extracted from a measurement image with a favorable degree of accuracy and the accuracy of measurement results can be improved.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

An embodiment of the present invention is described in detail below with reference to the drawings. Moreover, in the following description, an X direction is a left-right direction, a Y direction is a front-back direction, and a Z direction is an up-down direction in FIG. 1. In addition, an X-Y plane is a horizontal plane.

1. Description of Configuration

Figure 1:
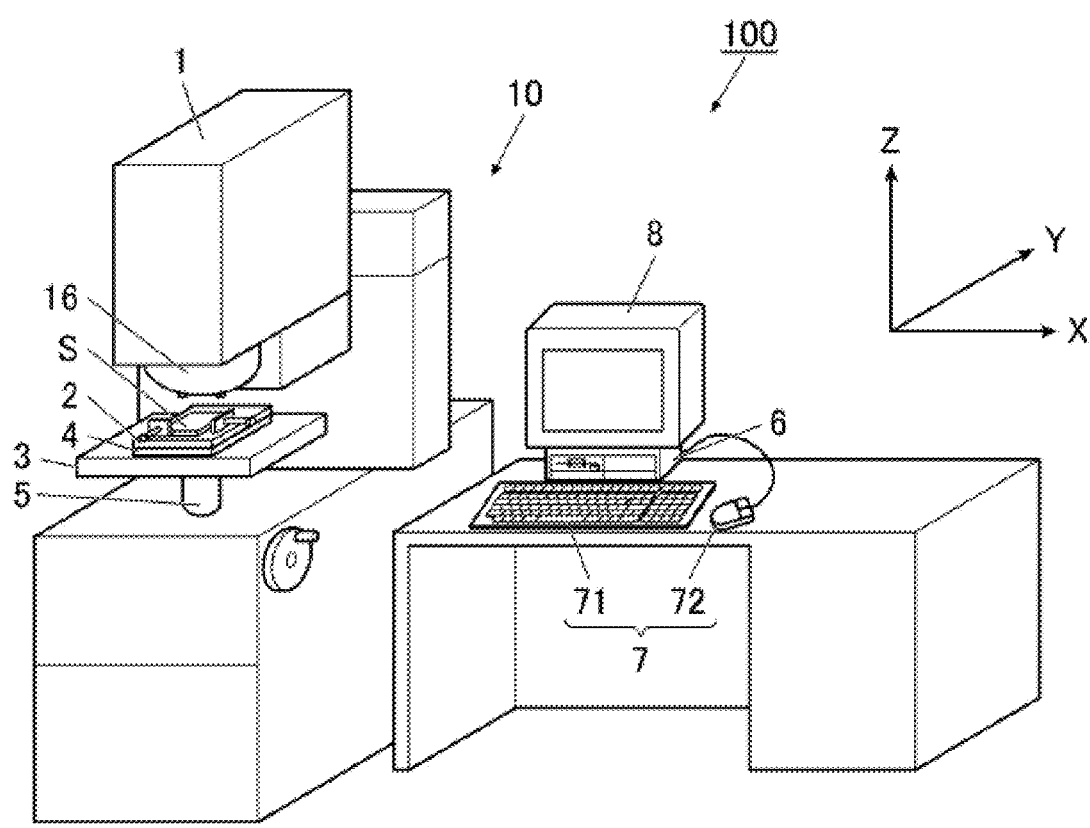
FIG. 1 is a perspective view illustrating an overall configuration of a hardness tester according to the present invention.

FIG. 1 is a perspective view illustrating an overall configuration of a hardness tester 100 according to the present embodiment. The hardness tester 100 is a Vickers hardness tester, for example, that includes an indenter 14a (see FIG. 3) having a rectangular planar shape. As shown in FIG. 1, the hardness tester 100 is configured to include, for example, a tester main body 10, a controller 6, a console 7, and a monitor 8.

Figure 2:
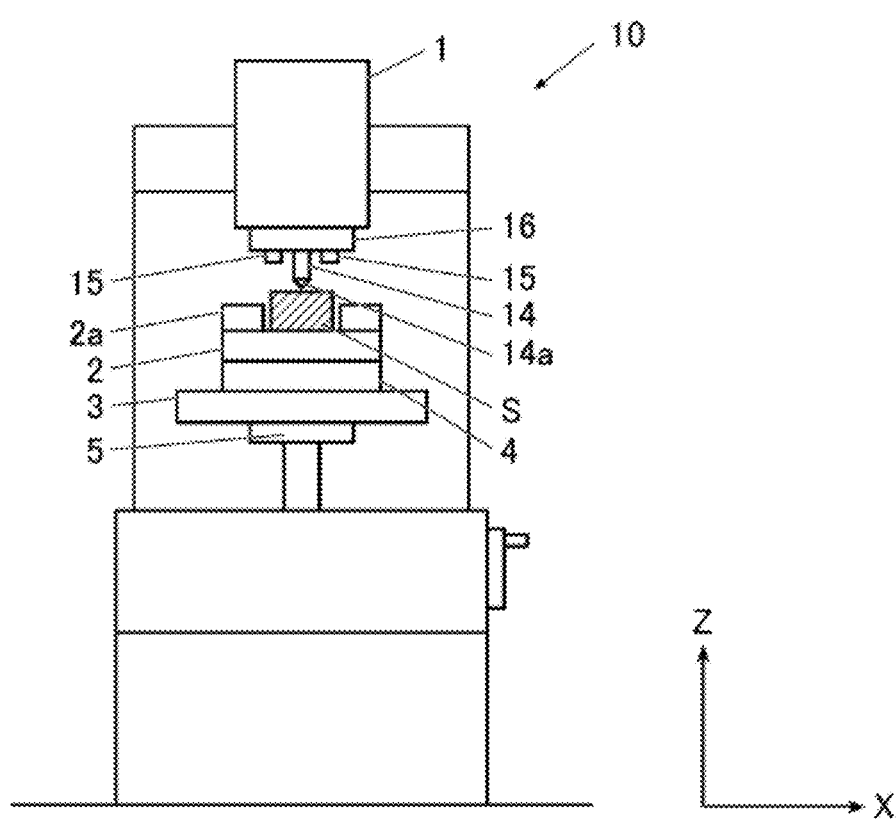
FIG. 2 is a schematic view illustrating a tester main body of the hardness tester according to the present invention.

FIG. 2 is a schematic view illustrating the tester main body 10 of the hardness tester 100. As shown in FIG. 2, the tester main body 10 includes, for example: a hardness measurer 1 measuring the hardness of a sample S; a sample stage 2 on which the sample S is placed; an XY stage 3 displacing the sample stage 2; an AF stage 4 enabling focusing on a surface of the sample S; and an elevator mechanism 5 raising and lowering the sample stage 2 (the XY stage 3 and the AF stage 4).

Figure 3:
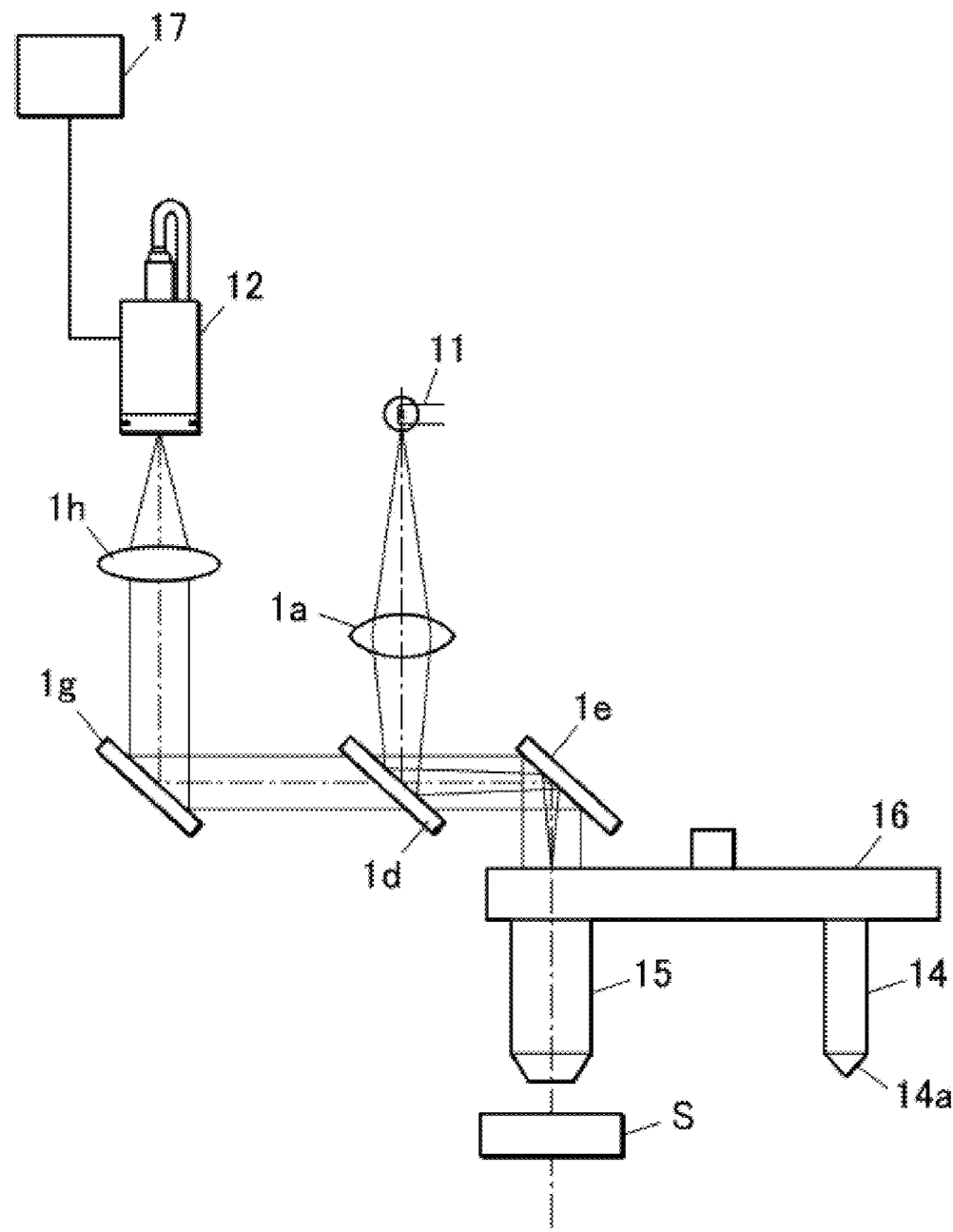
FIG. 3 is a schematic view illustrating a hardness measurer of the hardness tester according to the present invention.

FIG. 3 is a schematic view illustrating the hardness measurer 1 of the tester main body 10. As shown in FIG. 3, the hardness measurer 1 is configured to include, for example, an illumination device 11 illuminating the surface of the sample S; a CCD camera 12 capturing an image of the surface of the sample S; and a turret 16. The turret 16 includes an indenter column 14, which includes the indenter 14a, and a field lens 15. The turret 16 is capable of switching between the indenter column 14 and the field lens 15 by rotating.

The illumination device 11 shines a light to illuminate the surface of the sample S. The light shone by the illumination device 11 reaches the surface of the sample S via a lens 1a, a half mirror 1d, a mirror 1e, and the field lens 15.

Based on reflected light input from the surface of the sample S via the field lens 15, the mirror 1e, the half mirror 1d, a mirror 1g, and a lens 1h, the CCD camera 12 acquires image data by capturing an image of the surface of the sample S as well as an indentation formed in the surface of the sample S by the indenter 14a. The CCD camera 12 then outputs the acquired image data to the controller 6 via a frame grabber 17, which is capable of simultaneously accumulating and storing a plurality of frames of image data. In other words, the CCD camera 12, together with a CPU 61, serves as an image acquirer in the present invention.

The indenter column 14 is displaced toward the sample S placed on the sample stage 2 by a load mechanism (not shown in the drawings), which is driven in response to a control signal output by the controller 6. The indenter 14a, provided on a forefront end of the indenter column 14, is pressed against the surface of the sample S with a predetermined test force. The present embodiment uses a quadrangular pyramidal Vickers indenter (with opposing angles of 136±0.5°) as the indenter 14a.

The field lens 15 is a condenser in which each lens is configured with a different magnification, and a plurality of the field lenses 15 are retained on a bottom surface of the turret 16. The field lens 15 is situated above the sample S by rotating the turret 16. Thereby, the light shone by the illumination device 11 uniformly illuminates the surface of the sample S.

The turret 16 is configured to allow the indenter column 14 and the plurality of field lenses 15 to be attached to the bottom surface thereof. The turret 16 is also configured to be capable of positioning any one of the indenter column 14 and the plurality of field lenses 15 above the sample S by rotating the turret 16 centered around a Z axis direction. Specifically, an indentation can be formed in the surface of the sample S by positioning the indenter column 14 above the sample S, and the formed indentation can be observed by positioning the field lenses 15 above the sample S.

Returning to FIG. 2, the sample S is placed on an upper surface of the sample stage 2 and is fixed in place with a sample holder 2a. The XY stage 3 is driven by a drive mechanism (not shown in the drawings) driven in response to a control signal output by the controller 6. The XY stage 3 then displaces the sample stage 2 in a direction (X and Y directions) perpendicular to a displacement direction (Z direction) of the indenter 14a. The AF stage 4 is driven in response to the control signal output by the controller 6. The AF stage 4 then minutely raises and lowers the sample stage 2 based on the image data captured by the CCD camera 12 to focus on the surface of the sample S. The elevator mechanism 5 is driven in response to the control signal output by the controller 6. The elevator mechanism 5 then changes a relative distance between the sample stage 2 and the field lens 15 by displacing the sample stage 2 (the XY stage 3 and the AF stage 4) in the Z direction.

Returning to FIG. 1, the console 7 is configured to include, for example, a keyboard 71 and a mouse 72. The console 7 receives an input operation performed by a user during a hardness test. When the console 7 receives a predetermined input operation performed by the user, a predetermined operation signal corresponding to the input operation is generated and output to the controller 6. Specifically, the console 7 receives an operation in which the user selects a condition determining a focus position of the indentation. The console 7 also receives an operation in which the user designates a range of displacement (a range of relative distance between the sample stage 2 and the field lens 15) of the sample stage 2 (the elevator mechanism 5 and the AF stage 4). In addition, the console 7 receives an operation in which the user inputs a test condition value to be used when carrying out the hardness test with the hardness tester 100. The input test condition value is transmitted to the controller 6. Herein, the test condition value is a value such as a material of the sample S, a test force (N) loaded on the sample S by the indenter 14a, or a magnification power of the field lens 15, for example. In addition, the console 7 receives an operation in which the user selects one of a manual mode, in which the focus position of the indentation is manually determined, and an automatic mode, in which the determination is made automatically; an operation in which the user programs the test position to be used when carrying out the hardness test; or the like.

The monitor 8 is configured by a display device such as an LCD, for example. The monitor 8 displays, for example, hardness test settings input on the console 7, results of the hardness test, and an image of the surface of the sample S and the indentation formed in the surface of the sample S captured by the CCD camera 12.

Figure 4:
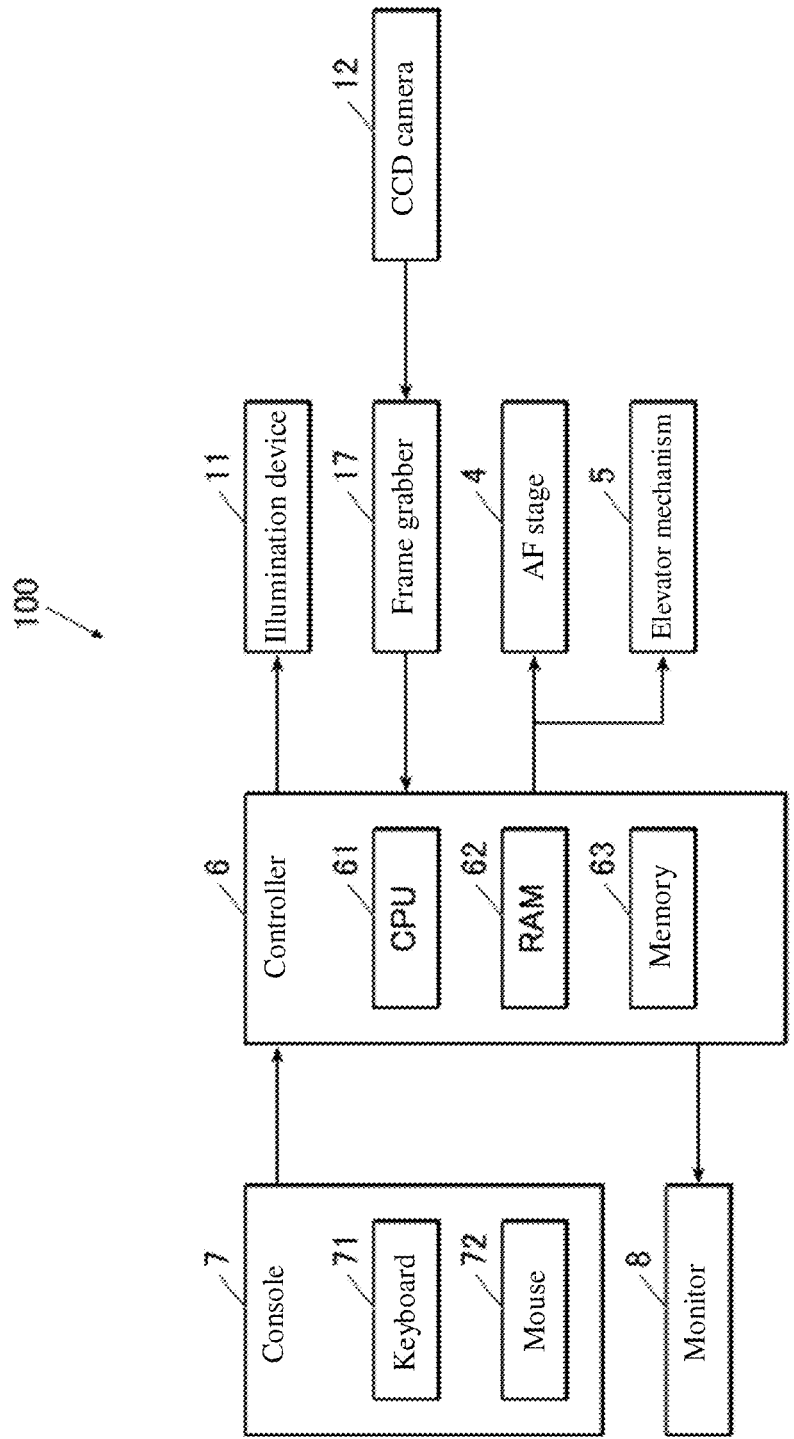
FIG. 4 is a block diagram illustrating a control structure of the hardness tester according to the present invention.

FIG. 4 is a block diagram of a control structure of the hardness tester 100. As shown in FIG. 4, the controller 6 is configured to include, for example, the CPU 61, a RAM 62, and a memory 63, where the CPU 61 serves as an image acquirer, an indentation region extractor, a determiner, a hardness calculator, and a selector. The controller 6 performs operation control for carrying out a predetermined hardness test, for example, by executing a predetermined program stored in the memory 63.

The CPU 61 retrieves a processing program or the like stored in the memory 63, then opens and executes the processing program in the RAM 62, thereby performing overall control of the hardness tester 100. The RAM 62 opens the processing program executed by the CPU 61 in a program storage region within the RAM 62 and stores in a data storage region input data, processing results generated during execution of the processing program, and the like. The memory 63 includes, for example, a recording medium (not shown in the drawings) storing a program, data, and the like. The recording medium is configured with a semiconductor memory, for example. In addition, the memory 63 stores various kinds of data, various kinds of processing programs, and data processed by running the programs that allow the CPU 61 to perform overall control of the hardness tester 100. Specifically, before beginning, the memory 63 stores an order in which a plurality of indentation region extraction processes executable by the hardness tester 100 are to be executed (execution hierarchy). The memory 63 also stores various kinds of data that are required when executing each of the plurality of indentation region extraction processes. The memory 63 also stores, for example, an image acquisition program, an indentation formation program, a first indentation region extraction program, a second indentation region extraction program, a third indentation region extraction program, an indentation apex extraction program, an indentation diagonal line length measurement program, a hardness calculation program, and a display control program.

2. Description of Operation

Next, operations of the hardness tester 100 according to the present embodiment are described. The hardness tester 100 according to the present embodiment is capable of executing a plurality of indentation region extraction processes that each use a different methodology to extract an indentation region. The plurality of indentation region extraction processes have an order of execution (execution hierarchy) that is defined ahead of time, and each time an indentation region is extracted by one of the plurality of indentation region extractors in accordance with the execution hierarchy, a determination is made as to whether reference indentation conditions that were defined ahead of time are matched, and thereby a determination is made as to whether the correct indentation region has been extracted. Then, when the correct indentation region is extracted, the hardness of the sample S is calculated based on the extracted indentation region. The execution hierarchy is decided ahead of time such that a process that is able to extract the indentation region with a favorable degree of accuracy (that is, a process having a high degree of indentation region extraction accuracy) is executed first, the degree of accuracy being determined as a result of applying each of the indentation region extraction processes to a standard test piece whose hardness value is already known. Also, in a case where there is no significant difference between the plurality of indentation region extraction processes, the execution hierarchy may be decided in order of shortest process time, for example. In this example, generally, there is a tendency for a process that is highly accurate to often be vulnerable to image noise, whereas a process that is highly robust against image noise is often lacking in accuracy. In the present embodiment, by executing the indentation region extraction processes in order beginning with the highly accurate process, an indentation region can be extracted by the highly accurate process for an image having little noise, and for an image with a lot of noise, the indentation region can be extracted by the highly robust process. As a result, indentation region extraction that is as highly accurate as possible can be performed and hardness measurement becomes possible for a variety of samples S. The execution hierarchy can also be arbitrarily set or modified by a user operation.

Figure 5:
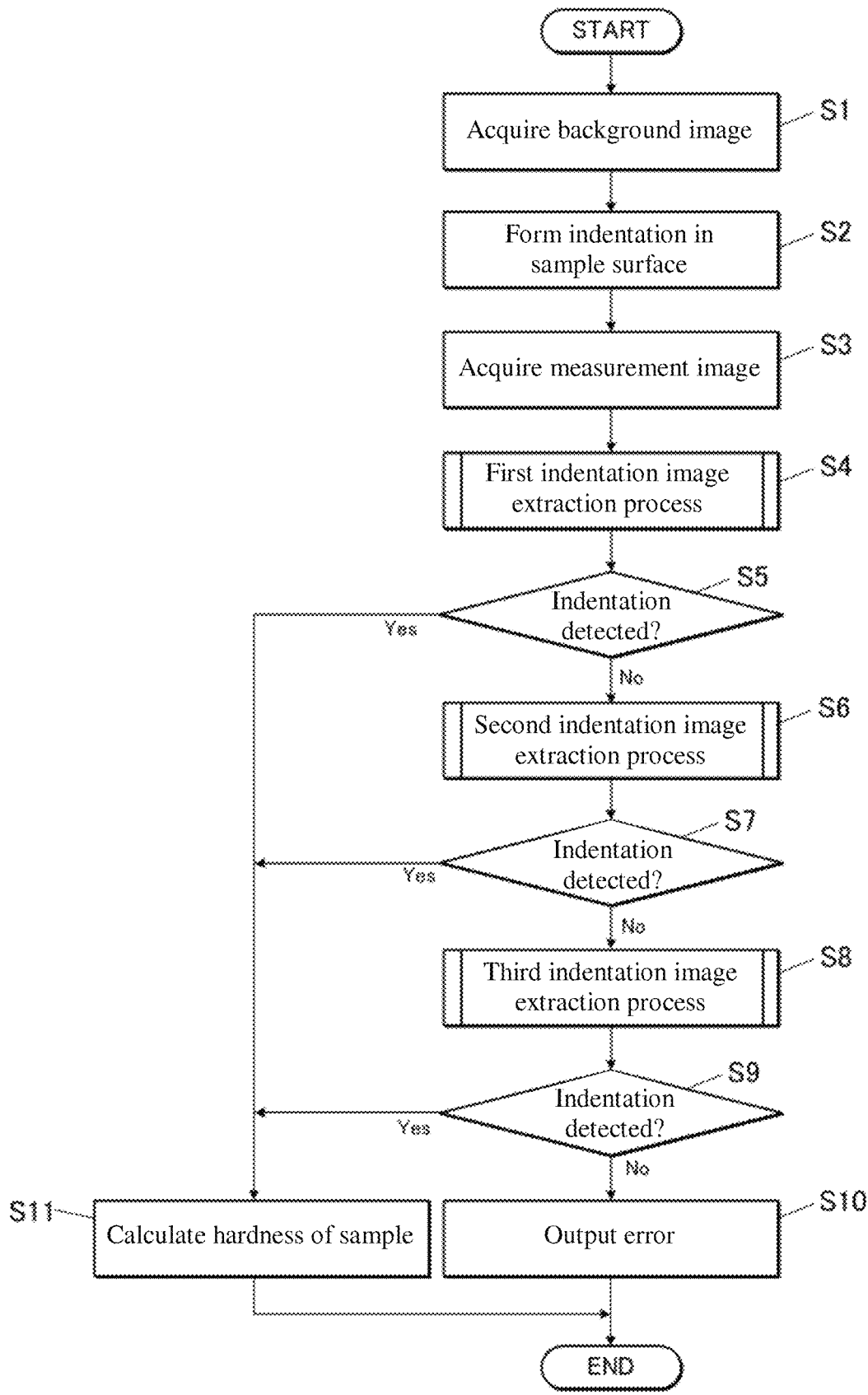
FIG. 5 is a flow chart illustrating operations of the hardness tester according to the present invention.

FIG. 5 is a flow chart illustrating operations of the hardness tester 100 described above. The process of the flow chart illustrated in FIG. 5 is initiated when, for example, the CPU 61 detects a start operation for a hardness test made via user operation of the console 7.

First, the CPU 61 acquires an image (background image) of the surface of the sample S (step S1). Specifically, first, the CPU 61 rotates the turret 16 to dispose the field lens 15 at a predetermined position opposite the sample S. Next, the CPU 61 raises and lowers the elevator mechanism 5 and AF stage 4 based on an image captured by the CCD camera 12 via the field lens 15, and brings the surface of the sample S into focus. Then, the CPU 61 captures an image of the surface of the sample S using the CCD camera 12, and acquires the image of the surface of the sample S output from the CCD camera 12. Then, the CPU 61 displays the acquired image of the surface of the sample S on the monitor 8.

Next, the CPU 61 forms the indentation in the surface of the sample S using the indenter 14a (step S2). Specifically, first, the CPU 61 rotates the turret 16 to dispose the indenter column 14, rather than the field lens 15, at the predetermined position opposite the sample S. Then, the CPU 61 drives the load mechanism (not shown in the drawings), thereby lowering the indenter column 14 and forming the indentation in the surface of the sample S with the indenter 14a provided to the forefront end of the indenter column 14.

Next, the CPU 61 acquires an image (measurement image) of the surface of the sample S on which the indentation is formed in step S2 (step S3).

Next, the CPU 61 runs the first indentation region extraction program stored in the memory 63, and thereby executes the indentation region extraction process that is first in the execution hierarchy (first indentation region extraction process) (step S4).

Figure 6:
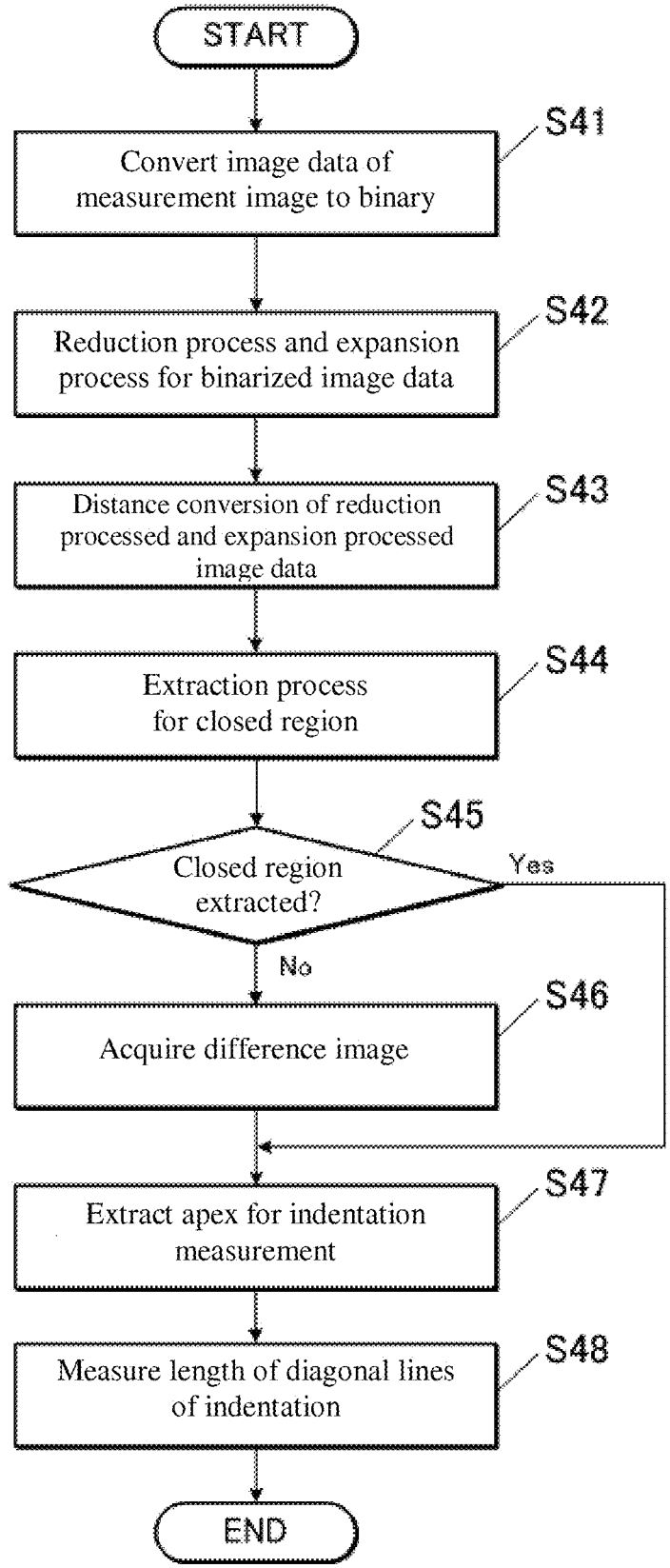
FIG. 6 is a flowchart illustrating a first indentation region extraction process.

FIG. 6 is a flowchart illustrating the first indentation region extraction process. As illustrated in FIG. 6, first, the CPU 61 converts the image data for the measurement image acquired in step S3 into binary (step S41). Specifically, the CPU 61 converts the image data of an original image (measurement image) that is a black and white density image into two-tone (black and white). Specifically, when a brightness value (lightness) of each pixel exceeds a predetermined threshold value, the CPU 61 replaces the pixel with white and when the brightness value is lower than the predetermined threshold value, the CPU 61 replaces the pixel with black, for example. By doing this, binarized black portions in the image data for the measurement image are displayed as more black compared to the original image and binarized white portions are displayed as more white compared to the original image. For example, the region of the indentation in the measurement image has a low brightness value compared to a background pixel and is displayed as a black pixel. The image data that is converted to binary in step S41 is stored in the memory 63.

Next, the CPU 61 generates copy data for the image data that is converted to binary in step S41, and performs a reduction process and expansion process for the binarized image data using the copy data of the binarized image (step S42). In this example, the reduction process is a process where a black pixel occupying a boundary between a black pixel and a white pixel in the binarized image data is trimmed by one pixel, and an isolated point or projection formed by a black pixel can be removed. Therefore, noise due to a scratch on the surface of the sample S or the like can be eliminated. Furthermore, the expansion process is a process where a black pixel occupying a boundary between a black pixel and a white pixel in the binarized image data is thickened by one pixel, and a groove or hole formed by a white pixel can be removed. Therefore, the profile of the extraction region can be smoothed out.

Next, the CPU 61 performs distance conversion of the image data which has undergone the reduction process and expansion process in step S42 (step S43). In this example, distance conversion refers to a process where, for each pixel in the binarized image data, a shortest distance from the position of each individual pixel to the position of a white pixel (background pixel) is taken as the distance value for each pixel.

Next, using the image data that has undergone distance conversion in step S43, the CPU 61 performs an extraction process of extracting a closed region that corresponds to the shape of the indenter 14a (step S44). Specifically, the CPU 61 scans the image data that has undergone distance conversion and performs chain coding of the closed region. The CPU 61 also stores in the memory 63 only a string of chain code that can be deemed to be the region of the indentation by calculating the area, predetermined criterion amount, or the like of the closed region. In this example, chain coding refers to a technique of coding by expressing the extension direction of lines in an eight-directional code (chain code). Furthermore, the predetermined criterion amount refers to a criterion that is obtained by combining the compactness of the region (=(perimeter×perimeter)÷area), the rate of change for the chain code (=number of times the chain code changes÷number of chain codes), and the like in order to determine whether the closed region forms a shape designated for extraction. Accordingly, a closed region that is determined to be exceedingly small or a closed region that is determined to not form the shape designated for extraction (shape of the indenter 14a) are not stored in the memory 63 and are ignored.

Next, the CPU 61 determines whether the closed region was extracted by the extraction process performed in step S44 (step S45). Specifically, the CPU 61 determines whether the closed region was extracted based on whether one or a plurality of closed regions were stored in the memory 63. The process as described in steps S41 through S44 is appropriate for cases where the surface of the sample S is a mirror surface, or similar. In other words, in cases where the surface of the sample S is a mirror surface, or similar, the closed region is extracted (one or a plurality of closed regions are stored in the memory 63).

Then, when the CPU 61 determines that the closed region was extracted (step S45: YES), the CPU 61 moves to step S47, which is detailed below.

Figure 7A:
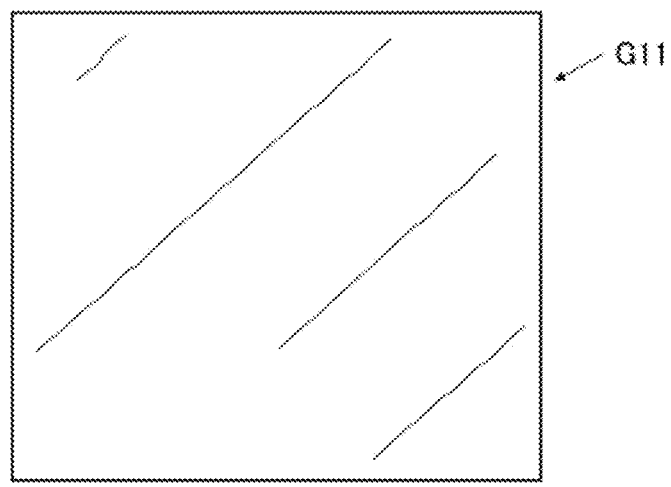
FIG. 7A illustrates an exemplary background image.
Figure 7B:
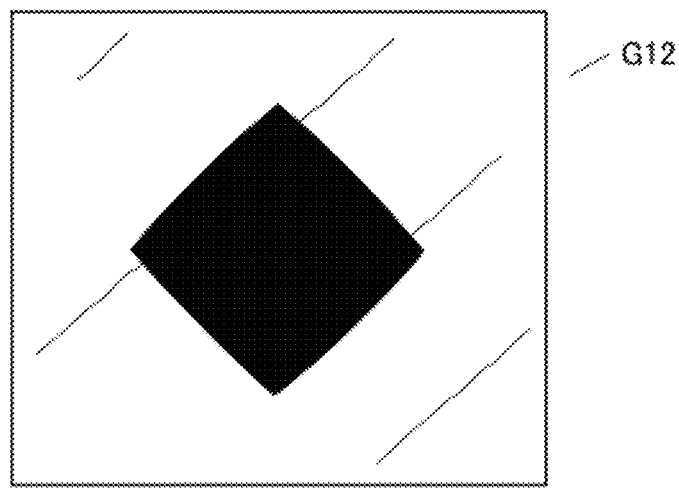
FIG. 7B illustrates an exemplary measurement image.
Figure 7C:
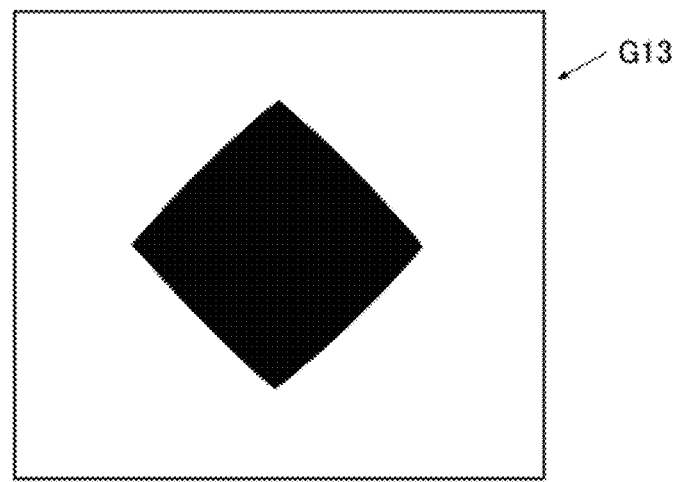
FIG. 7C illustrates an exemplary difference image.

Meanwhile, when the CPU 61 determines that the closed region is not extracted (step S45: NO), the CPU 61 subtracts the image data for the background image from the image data for the measurement image to obtain image data for a difference image (step S46). FIG. 7A illustrates an exemplary background image G11, FIG. 7B illustrates an exemplary measurement image G12, and FIG. 7C illustrates an exemplary difference image G13. In the examples shown in FIGS. 7A and 7B, the surface of the sample S is not a mirror surface, and a scratch unrelated to the indentation is present on the surface of the sample S. Accordingly, by subtracting the image data for the background image G11 from the image data for the measurement image G12, data for the scratch and the like in the measurement image G12 is eliminated. Therefore, as illustrated in FIG. 7C, only the indentation region appears in the difference image G13, with the scratch and so on removed.

The method of producing the difference image is not limited to the above description. For example, a method in which an absolute value of the difference in image value undergoes negative/positive inversion, a method performed based on differences in power spectrum, or other methods can also be used. In this example, a method in which an absolute value of the difference in image value undergoes negative/positive inversion refers to a method that takes into consideration that when simply subtracting the two sets of image data as described above, the image value may be a negative value due to the influence of noise during image acquisition, and after processing, this may lead to an unfavorable outcome. Specifically, because the difference in image values is large in the indentation region, the absolute value of the subtraction result is taken and an image is produced in which a location with a large value is deemed to be the indentation region. For an image obtained in this way, the image value of the indentation region is large compared to others, and is the opposite of an ordinary image (ordinarily, the image value of the indentation region is a smaller value than those around it). Therefore, the image value is inverted (negative/positive inversion) and the process continues into the subsequent processes. Furthermore, a method performed based on differences in power spectrum refers to a method in which the Fourier transform of the background image is designated F(u, v) and the Fourier transform of the measurement image is designated G(u, v), the absolute value of the difference for the power spectrum thereof ||G(u, v)|−|F(u, v)|| is found, the result undergoes Fourier inverse transformation, and the difference image is found. The value of the measurement image may be used for the phase. Using such a method, rotation error of a turret can be alleviated better than with a method where the difference in image values is found directly.

Next, the CPU 61 extracts the apex for indentation measurement used for measuring the dimensions of the indentation formed in the surface of the sample S based on the profile of the extracted closed region when the closed region is extracted by the extraction process performed in step S44, and using the difference image obtained in step S46 when the closed region is not extracted (step S47). The process of extracting the apex for indentation measurement can employ a technique that is commonly known in the art.

Next, the CPU 61 references coordinate values of the apex for indentation measurement that was extracted in step S47 and measures the length of the diagonal lines of the indentation (step S48).

Returning to FIG. 5, the CPU 61 determines whether the indentation was successfully detected using the first indentation region extraction process described above (step S5). Specifically, the CPU 61 compares conditions of the indentation that are based on the length of the diagonal lines of the indentation calculated by the first indentation region extraction process described above (shape, size, and the like) with conditions of a reference indentation (shape, size, and the like) that are predefined based on the indenter used, test force, and the like, and when the conditions of the indentation calculated by the first indentation region extraction process described above are determined to match the reference indentation conditions, the CPU 61 determines that the indentation was successfully detected.

In the present embodiment, in the first indentation region extraction process as noted above, the indentation region of a sample S having comparatively few scratches or the like can be extracted. Also, although not depicted in the drawings, even with a sample S that initially is largely a mirror surface and which becomes wrinkled by forming the indentation, the indentation region can be extracted with the first indentation region extraction process.

Then, when the CPU 61 determines that the indentation was successfully detected (step S5: YES), the CPU 61 moves to step S11, which is detailed below.

Meanwhile, when the CPU 61 determines that the indentation was not successfully detected (step S5: NO), the CPU 61 runs the second indentation region extraction program stored in the memory 63, and thereby executes the indentation region extraction process that is second in the execution hierarchy (second indentation region extraction process) (step S6).

Figure 8:
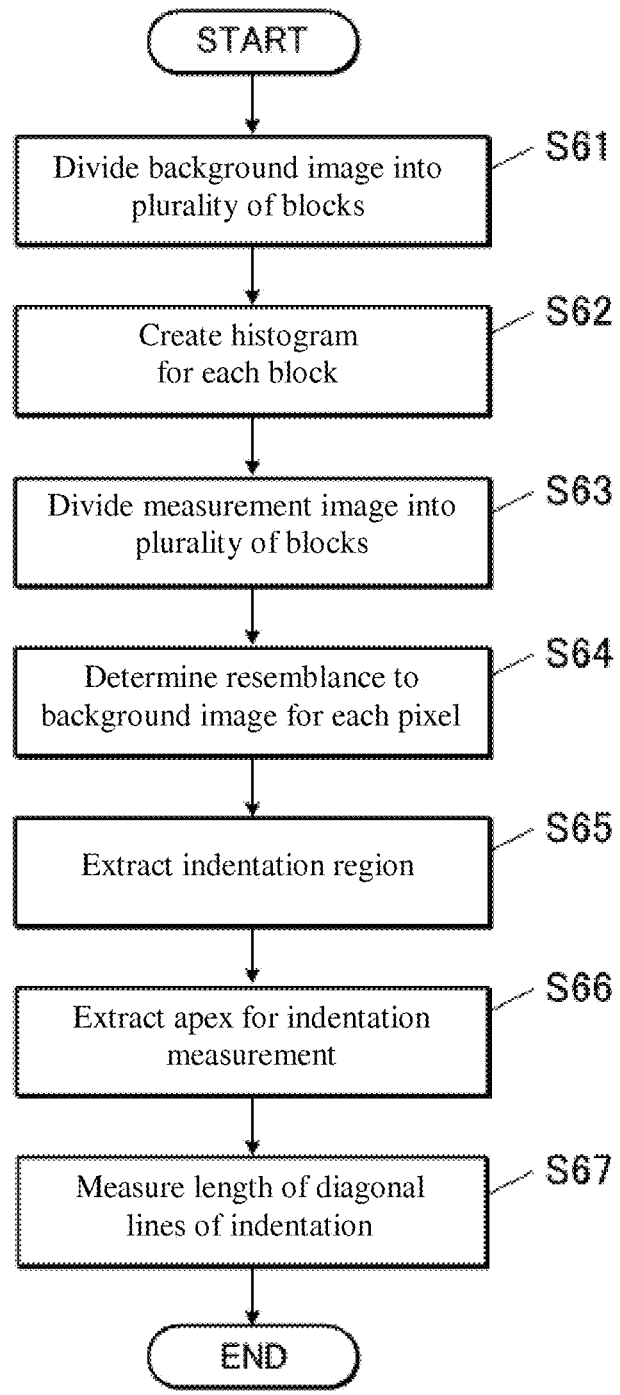
FIG. 8 is a flowchart illustrating a second indentation region extraction process.
Figure 9A:
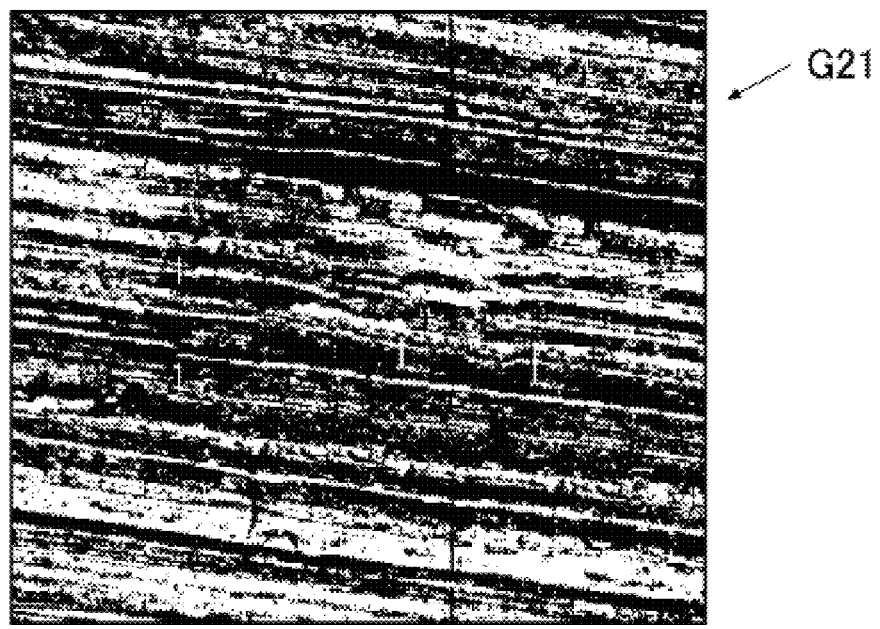
FIG. 9A illustrates an exemplary background image.
Figure 9B:
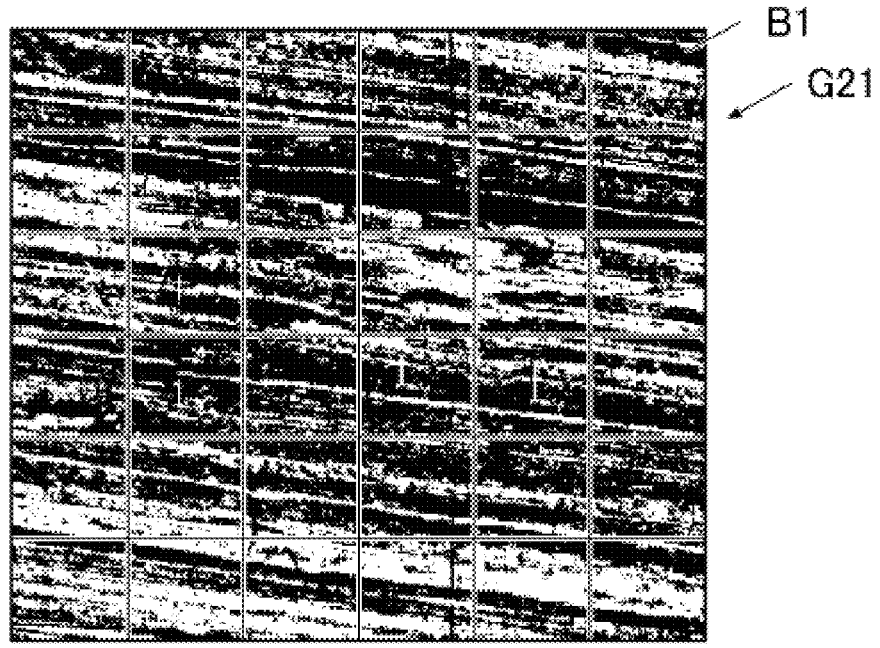
FIG. 9B illustrates an example where the background image is divided into a plurality of blocks.

FIG. 8 is a flowchart illustrating the second indentation region extraction process. As illustrated in FIG. 8, first, the CPU 61 divides the background image acquired in step S1 into a plurality of blocks (step S61). FIG. 9A illustrates an exemplary background image G21, and FIG. 9B illustrates an example where the background image G21 is divided into a plurality of blocks B1. In the example shown in FIG. 9B, the background image G21 is divided into 36 blocks (6×6).

Next, the CPU 61 creates a histogram of brightness information for each block divided in step S61 (step S62). In this example, the histogram shows the numerical count (appearance frequency) of each brightness value (tone value) in the region. For example, for each block divided in step S61, the CPU 61 divides RGB into 64 tones each and creates a three-dimensional histogram (64*64*64).

Figure 10A:
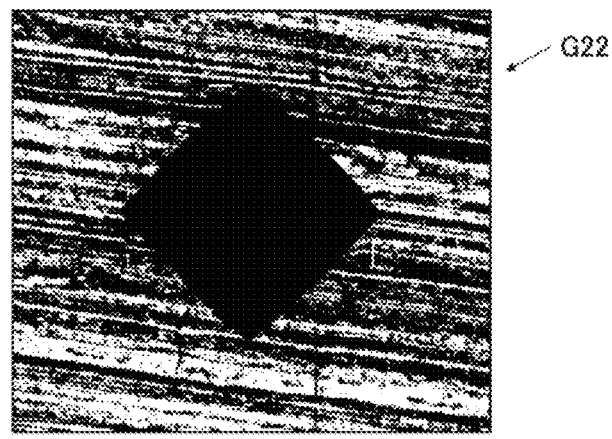
FIG. 10A illustrates an exemplary measurement image.
Figure 10B:
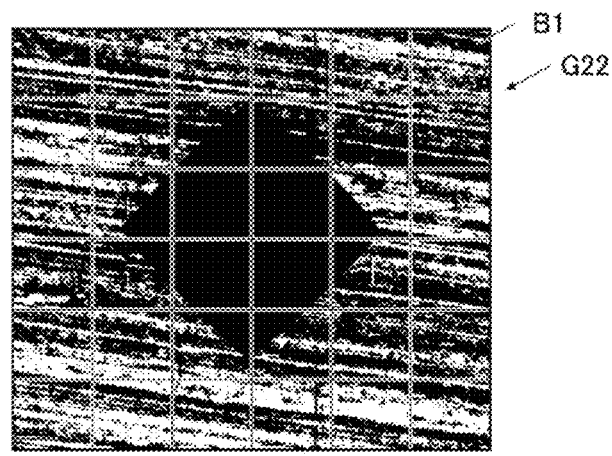
FIG. 10B illustrates an example where the measurement image is divided into a plurality of blocks.

Next, the CPU 61 divides the measurement image acquired in step S3 into a plurality of blocks (step S63). In step S63, the CPU 61 divides the measurement image using a division format similar to that of the background image. FIG. 10A illustrates an exemplary measurement image G22, and FIG. 10B illustrates an example where the measurement image G22 is divided into a plurality of blocks B1. In the example shown in FIG. 10B, the measurement image G22 is divided into 36 (6×6) blocks B1, similar to the background image G21 shown in FIG. 9B.

Next, for each pixel in each block B1 divided in step S63, the CPU 61 references the histogram created at block B1 in the background image G21, which corresponds to the block B1 containing the pixel, and determines the pixel's resemblance to the background image G21 (step S64). For example, when the histogram has a high incidence at the brightness value of the pixel subject to determination, the CPU 61 determines a high value for the resemblance to the background image G21, and when the histogram has a low incidence, the CPU 61 determines a low value for the resemblance to the background image G21. In step S64, the resemblance to the background image G21 is determined probabilistically, for example, and is output as a value between 0 (0%) and 1.0 (100%).

Figure 11:
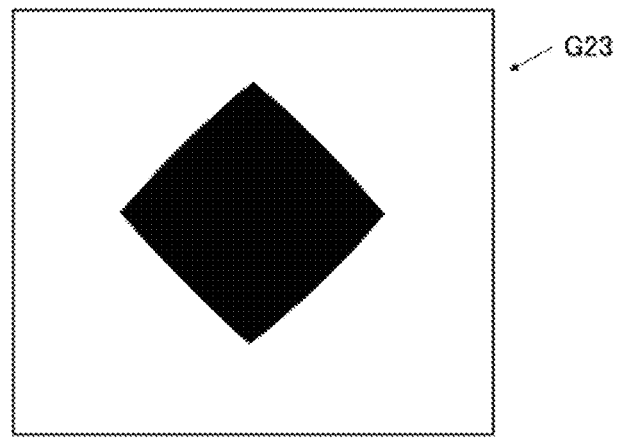
FIG. 11 illustrates an exemplary extracted image that includes the indentation region extracted from the measurement image.

Next, based on the determination result of step S64, the CPU 61 determines whether each pixel is a background image or an indentation image, and extracts the indentation region (step S65). For example, using a predetermined threshold value, when the resemblance to the background image is equal to or greater than the threshold value, the CPU 61 deems that the pixel is a background image, and when the resemblance to the background image is less than the threshold value, the CPU 61 deems that the pixel is an indentation image. FIG. 11 illustrates an exemplary extracted image G23 that includes the indentation region extracted in step S65.

Next, based on the indentation region extracted in step S65, the CPU 61 extracts the apex for indentation measurement used for measuring the dimensions of the indentation formed in the surface of the sample S (step S66). The process of extracting the apex for indentation measurement can employ a technique that is commonly known in the art.

Next, the CPU 61 references coordinate values of the apex for indentation measurement that was extracted in step S65 and measures the length of the diagonal lines of the indentation (step S67).

Returning to FIG. 5, the CPU 61 determines whether the indentation was successfully detected using the second indentation region extraction process described above (step S7). Specifically, the CPU 61 compares conditions of the indentation that are based on the length of the diagonal lines of the indentation calculated by the second indentation region extraction process described above (shape, size, and the like) with conditions of a reference indentation (shape, size, and the like) that are predefined based on the indenter used, test force, and the like, and when the conditions of the indentation calculated by the second indentation region extraction process described above are determined to match the reference indentation conditions, the CPU 61 determines that the indentation was successfully detected.

In the present embodiment, in the second indentation region extraction process as noted above, the indentation region can be extracted even for a sample S having a large number of scratches or the like. Also, even when the position of the CCD camera 12 (image capture region) has shifted during acquisition of the measurement image, the indentation region can be extracted using the second indentation region extraction process.

Then, when the CPU 61 determines that the indentation was successfully detected (step S7: YES), the CPU 61 moves to step S11, which is detailed below.

Meanwhile, when the CPU 61 determines that the indentation was not successfully detected (step S7: NO), the CPU 61 runs the third indentation region extraction program stored in the memory 63, and thereby executes the indentation region extraction process that is third in the execution hierarchy (third indentation region extraction process) (step S8).

Figure 12:
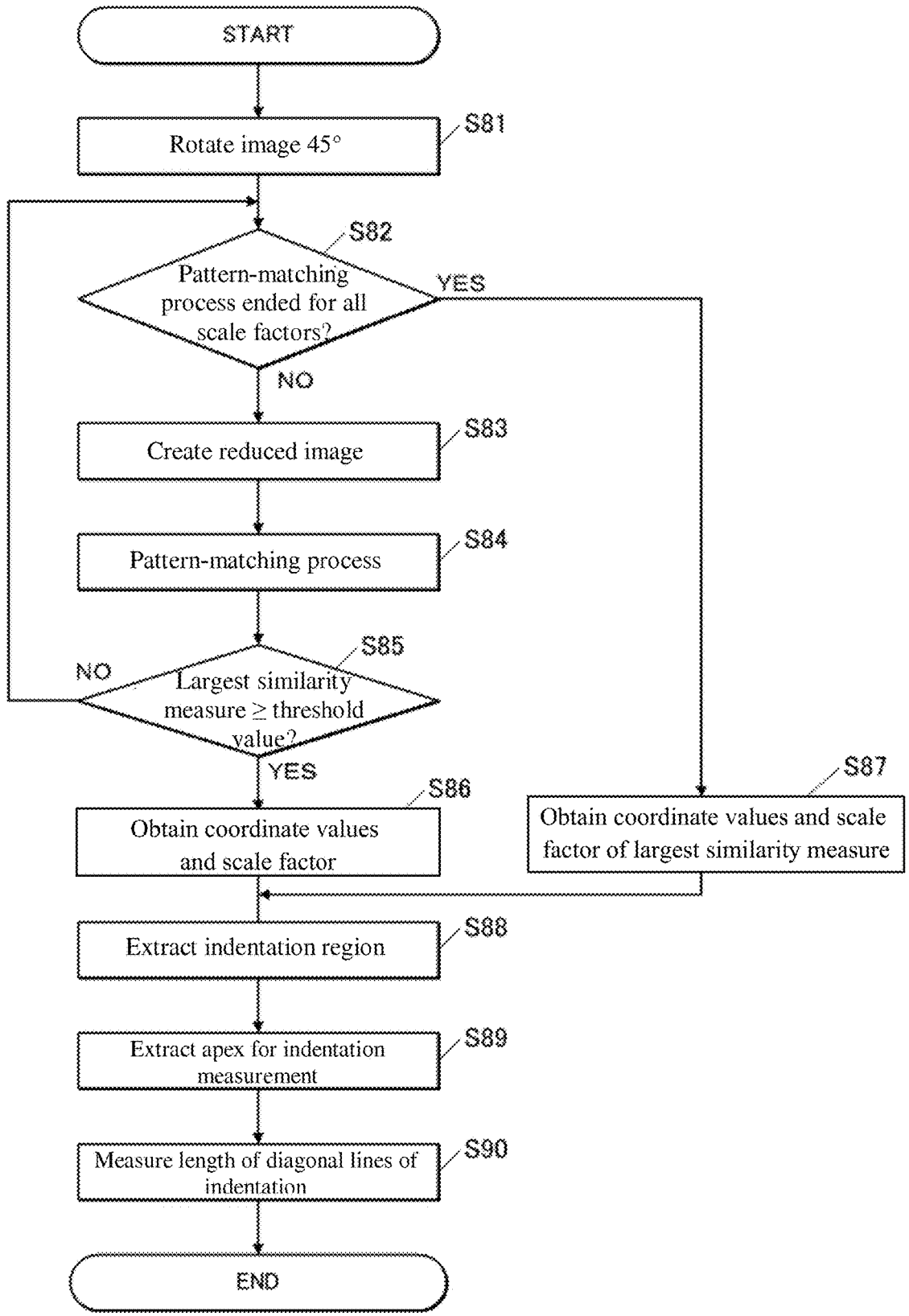
FIG. 12 is a flowchart illustrating a third indentation region extraction process.

FIG. 12 is a flowchart illustrating the third indentation region extraction process. As illustrated in FIG. 12, first, the CPU 61 rotates the measurement image acquired in step S2 by 45° (step S81).

Next, the CPU 61 determines whether a pattern-matching process has ended for all scale factors (step S82). Specifically, the CPU 61 determines whether the pattern-matching process (see step S84) has ended for all scaled-down images, which are obtained by reducing the measurement image, which was rotated 45° in step S81, at all scale factors stored in the memory 63 ahead of time.

Then, when the CPU 61 determines that the pattern-matching process has ended for all scale factors (step S82: YES), the process moves to step S87.

Figure 13A:
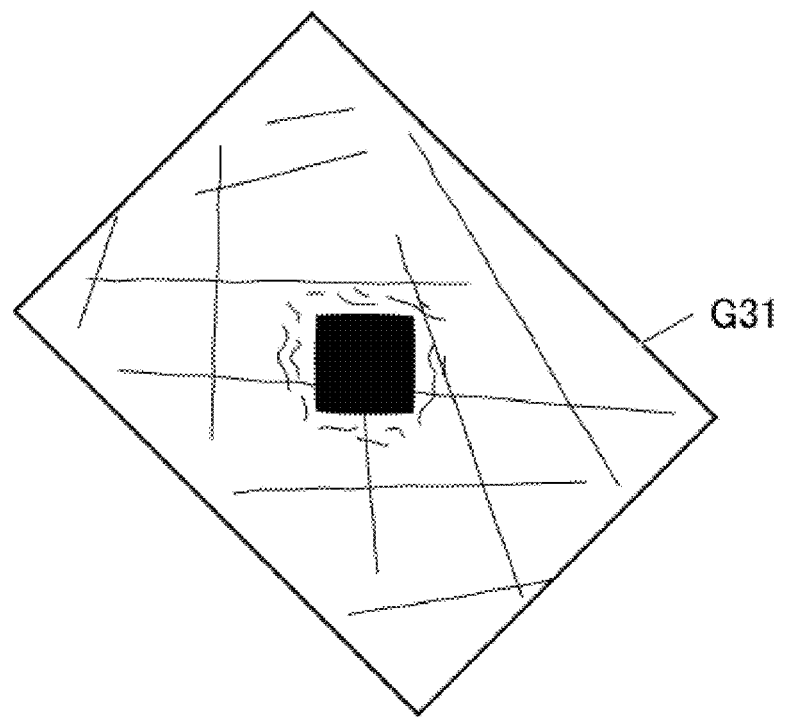
FIG. 13A illustrates an example where a measurement image is rotated 45°.
Figure 13B:
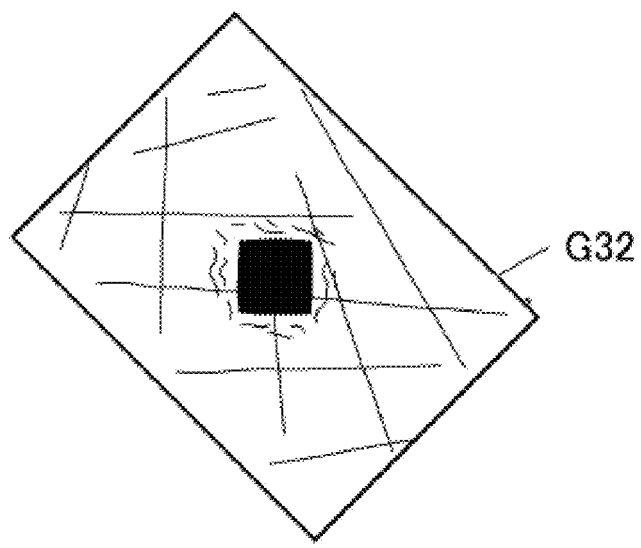
FIG. 13B illustrates an example of a reduced image.

Meanwhile, when the CPU 61 determines that the pattern-matching process has not ended for at least one scale factor (step S82: NO), the CPU 61 reduces the measurement image rotated 45° in step S81 by a scale factor selected from among the plurality of scale factors stored in the memory 63 and generates a reduced image (step S83). FIG. 13A illustrates an exemplary measurement image G31 that has been rotated 45° in step S81, and FIG. 13B illustrates an exemplary reduced image G32 that is generated in step S83. The reduced image G32 generated in step S83 is an image that is reduced at a scale factor for which the pattern-matching process has not yet ended.

Next, the CPU 61 performs the pattern-matching process on the reduced image G32 generated in step S83 (step S84). A normalized correlation method, for example, can be used as the pattern-matching process. Hereafter, a pattern-matching process using normalized correlation is described.

Figure 14:
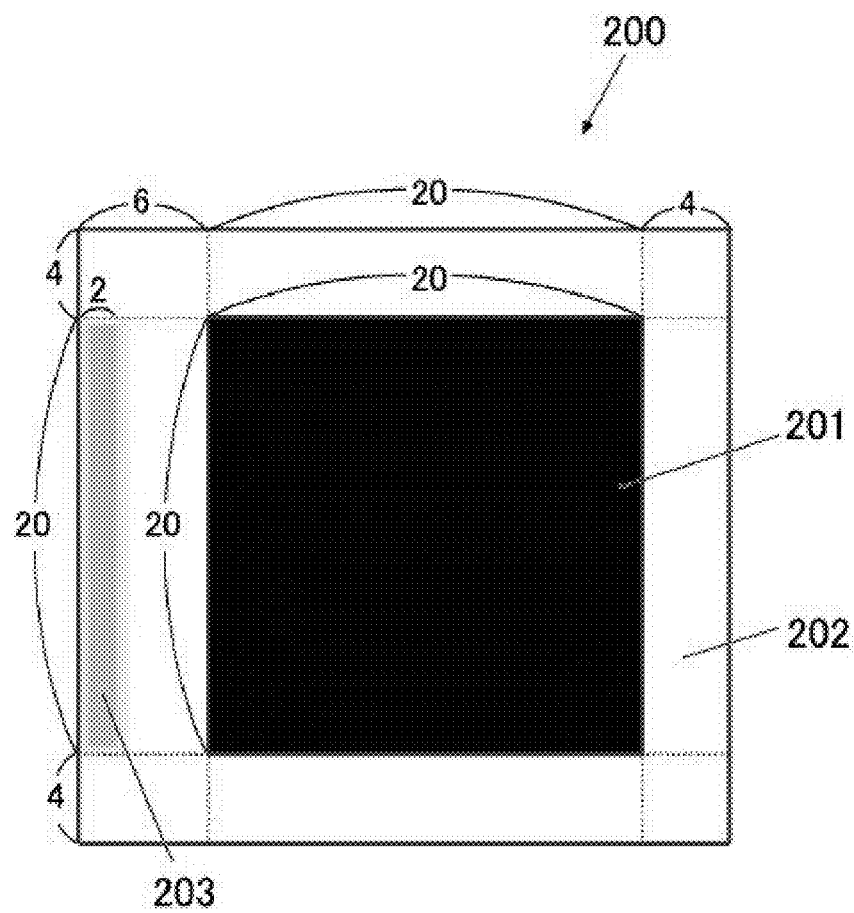
FIG. 14 illustrates an exemplary scanning model.

In the present embodiment, the pattern-matching process is performed using a scanning model 200 illustrated in FIG. 14. The scanning model 200 is formed in a rectangular shape and is configured to be 840 pixels (28 pixels in the X direction and 30 pixels in the Y direction). The scanning model 200 includes a black region 201 arranged at substantially the central portion of the scanning model 200, the black region 201 corresponding to a known indentation shape that corresponds to the indenter 14a, rotated 45°; a white region 202 covering a periphery of the black region 201; and a gray region 203 arranged at the central portion of a left edge portion of the scanning model 200. The gray region 203 is not used in the matching process. The black region 201 is configured to be 400 pixels (20 pixels in both row and column directions). The gray region 203 is configured to be 40 pixels (20 pixels in the row direction and 2 pixels in the column direction). The white region 202 is configured to be 400 pixels, excluding the black region 201 and the gray region 203 from the total region. In other words, the black region 201 and the white region 202 are configured to have the same number of pixels. Accordingly, when each pixel configuring the black region 201 is counted as −1 and each pixel configuring the white region 202 is counted as 1, the sum of the pixels used by the scanning model 200 is 0.

Figure 15:
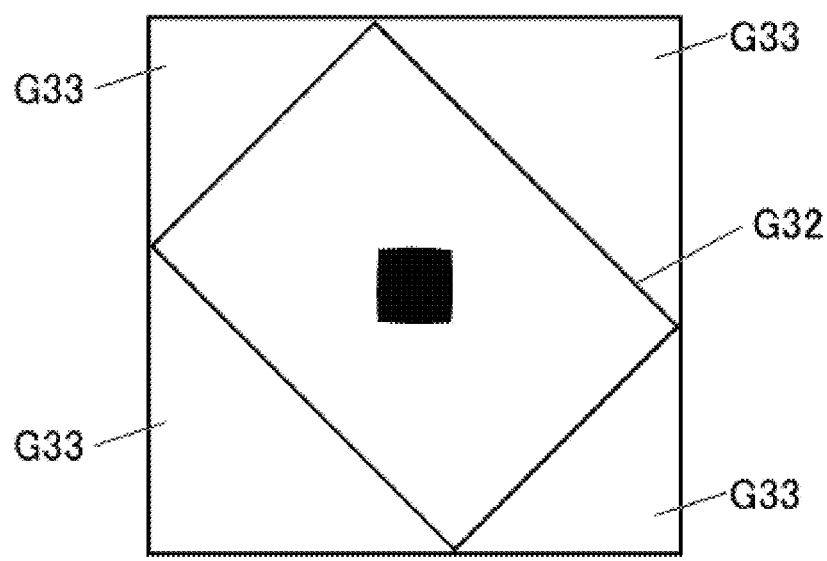
FIG. 15 illustrates a region where a matching process for a periphery of the reduced image is not performed.
Figure 16:
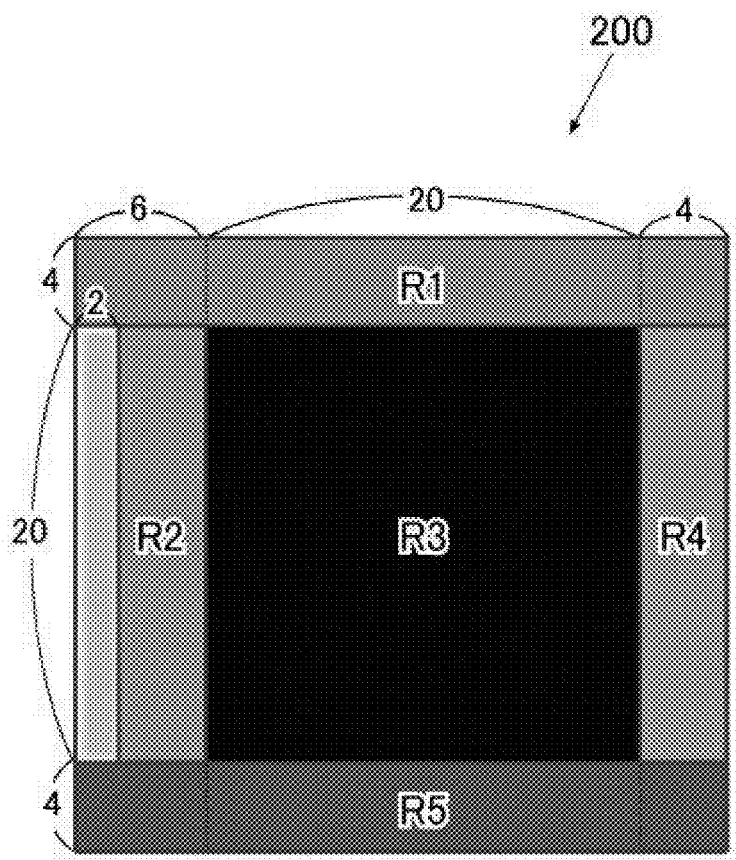
FIG. 16 illustrates an example where the scanning model shown in FIG. 14 is divided into five regions.

In the present embodiment, the matching process is performed on the reduced image G32 generated in step S83 by performing a raster scan using the scanning model 200. The matching process is not performed for regions G33 where no image is formed around the reduced image G32, as illustrated in FIG. 15. Specifically, first, the scanning model 200 is divided into five regions R1 to R5, as illustrated in FIG. 16. Region R3 is assigned to the black region 201, and the remaining regions R1, R2, R4, and R5 are assigned to the white region 202. In this example, where the totals of the brightness values for each of the regions R1 to R5 are designated A to E, respectively; the totals of the squares of the brightness values for each of the regions R1 to R5 are designated A2 to E2, respectively; the number of −1 (black) or 1 (white) pixels is designated N; and the total of A to E is K, a similarity measure m can be calculated using formula 1.

$$m = (A+B+D+E-C)/\text{sqrt}(N)/\text{sqrt}(A2+B2+C2+D2+E2-K*K/N) \quad (1)$$

Then, when the similarity measure m is calculated for all regions of the reduced image G32, the pattern-matching process ends.

Next, the CPU 61 determines whether the largest similarity measure calculated by the pattern-matching process in step S84 is equal to or greater than a predetermined threshold value (step S85). The predetermined threshold value may be any value having an acceptable level of correlation with the indentation region.

Then, when the CPU 61 determines that the largest similarity measure is equal to or greater than the threshold value (step S85: YES), the CPU 61 determines that the indentation region is included in the reduced image G32 generated in step S83, acquires the coordinate values exhibiting the largest similarity measure and the scale factor of the reduced image G32 (step S86), and extracts the indentation region based on this information (step S88).

Meanwhile, when the CPU 61 determines that the largest similarity measure is less than the threshold value (step S85: NO), the process moves to step S82.

In addition, when the CPU 61 determines that the pattern-matching process has ended for all scale factors (step S82: YES), the CPU 61 determines that the indentation region is included in the reduced image G32 that includes the largest similarity measure from among all the degrees of correlation calculated by the pattern matching process, which was performed at all scale factors; acquires the coordinate values exhibiting the largest similarity measure and the scale factor of the reduced image G32 (step S87); and extracts the indentation region based on this information (step S88).

Next, based on the indentation region extracted in step S88, the CPU 61 extracts the apex for indentation measurement used for measuring the dimensions of the indentation formed in the surface of the sample S (step S89). The process of extracting the apex for indentation measurement can employ a technique that is commonly known in the art.

Next, the CPU 61 references coordinate values of the apex for indentation measurement that was extracted in step S89 and measures the length of the diagonal lines of the indentation (step S90).

Returning to FIG. 5, the CPU 61 determines whether the indentation was successfully detected using the third indentation region extraction process described above (step S9). Specifically, the CPU 61 compares conditions of the indentation that are based on the length of the diagonal lines of the indentation calculated by the third indentation region extraction process described above (shape, size, and the like) with conditions of a reference indentation (shape, size, and the like) that are predefined based on the indenter used, test force, and the like, and when the conditions of the indentation calculated by the third indentation region extraction process described above are determined to match the reference indentation conditions, the CPU 61 determines that the indentation was successfully detected.

In the present embodiment, in the third indentation region extraction process as noted above, the indentation region can be extracted accurately even for a sample S having a large number of scratches or the like and having wrinkles formed on the periphery of the indentation after indentation formation. The indentation region can also be extracted in cases where changes in the image values are not clear because the sample is extremely hard and the indentation is not deep, cases where cracks form in the test piece due to striking the indentation, and so on.

Then, when the CPU 61 determines that the indentation has not been successfully detected (step S9: NO), the CPU 61 executes control of the monitor 8, outputs an error (step S10), and ends the process.

Meanwhile, when the CPU 61 determines that the indentation has been successfully detected (step S9: YES), the CPU 61 calculates the hardness of the sample S based on the length of the measured diagonal lines (step S11), executes control of the monitor 8, displays the hardness of the sample S calculated in step S11, and ends the process.

3. Effect

In the above, according to the present embodiment, the hardness tester 100 loads a predetermined test force and forms an indentation in the surface of the sample S using an indenter, and measures the hardness of the sample S by measuring dimensions of the indentation. The CPU 61 can execute a plurality of indentation region extraction processes that use mutually distinct methods, the indentation region extraction processes each using the CCD camera 12 to acquire an image of the surface of the sample S before and after the indentation is formed, and extracting the indentation region based on the acquired images. The CPU 61 also makes a determination determining whether the indentation region extracted by the plurality of indentation region extraction processes matches the predefined reference indentation region, and based on an indentation region that is determined to match, the CPU 61 calculates the hardness of the sample S. Therefore, indentation region extraction can be accomplished with a favorable degree of accuracy for various samples S which behave differently during indentation formation or have different surface conditions. Accordingly, an indentation region can be extracted from a measurement image with a favorable degree of accuracy and the accuracy of measurement results can be improved.

In addition, according to the present embodiment, the plurality of indentation region extraction processes have an execution hierarchy that is defined ahead of time, and each time an indentation region is extracted by one of the plurality of indentation region extraction processes in accordance with the execution hierarchy, the CPU 61 determines whether the indentation region matches reference indentation conditions. Therefore, the plurality of indentation region extraction processes are executed in accordance with a predefined order.

Also, according to the present embodiment, the execution hierarchy is an order that prioritizes an item having a greater degree of extraction accuracy, based on the results, obtained ahead of time, of extracting an indentation region with each indentation region extractor using a standard test piece having a predetermined hardness. Generally, a process with high accuracy is often vulnerable to image noise and a process that is highly robust against image noise is often lacking in accuracy. Given this, by executing the indentation region extraction processes in order beginning with the highly accurate process, an indentation region can be extracted by the highly accurate process for an image having little noise, and for an image with a lot of noise, the indentation region can be extracted by the highly robust process. Therefore, indentation region extraction is possible for a variety of samples S, and indentation region extraction accuracy can be elevated as much as possible.

In the above, a concrete description is given based on the embodiment according to the present invention. However, the present invention is not limited to the above-described embodiment and can be modified without deviating from the scope of the invention.

For example, indentation region extraction processes using three different methods are employed in the embodiment described above, but there may be two, or four or more, indentation region extraction processes. In addition, the indentation region extraction processes are not limited to the methods described in the above embodiment. Any method capable of extracting an indentation region can be applied.

Furthermore, in the embodiment described above, an example is described of a process that executes the three indentation region extraction processes in order until the indentation is successfully detected. However, the indentation region extraction process suited to the given sample may be selected at the initial stage of the hardness test, for example, and indentation region extraction may be performed initially with the selected indentation region extraction process. Specifically, for example, a configuration can be adopted in which an image of a sample surface is associated with a type of indentation region extraction process and stored ahead of time, and at the stage where the background image of the sample is acquired, the type of indentation region extraction process is selected. Alternatively, a configuration is also possible in which a name of a sample material is associated with the type of indentation region extraction process and stored ahead of time, and the user selects the name of the material at the stage where the sample is set up, whereby the type of indentation region extraction process is selected. Then, when the indentation region extraction process is selected in the above-noted way, processes from that point on in the execution hierarchy may be executed in order until the indentation region is extracted.

Also, the embodiment described above uses a Vickers hardness test method, but the hardness measuring device according to the present invention is not limited to this and may be similarly applied to a Knoop hardness test method, Brinnell hardness test method, or other equivalent hardness test method that uses an indenter pressing methodology.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A hardness tester that loads a predetermined test force and forms an indentation in a surface of a sample using an indenter, and measures the hardness of the sample by measuring dimensions of the indentation, the hardness tester comprising: a processor and a memory that stores an instruction, wherein the processor executes the instruction stored in the memory such that the processor operates as:

an image acquirer that acquires an image of the surface of the sample before and after the indentation is formed;

a plurality of indentation region extractors that use mutually distinct methods, each indentation region extractor of the plurality of indentation region extractors configured to extract an indentation region based on the images acquired by the image acquirer;

a determiner that determines whether the indentation region extracted by the plurality of indentation region extractors matches a predefined reference indentation condition; and a hardness calculator that calculates the hardness of the sample based on an indentation region that is determined by the determiner to match the predefined reference indentation condition.

2. The hardness tester according to claim 1, wherein:

the determiner determines whether the reference indentation condition is matched each time an indentation region is extracted by one of the plurality of indentation region extractors in accordance with the execution hierarchy.

3. The hardness tester according to claim 2, wherein the execution hierarchy is an order that prioritizes an item having a greater degree of extraction accuracy, based on the results obtained ahead of time, of extracting an indentation region with each indentation region extractor of the plurality of indentation region extractors, using a standard test piece having a predetermined hardness.

4. The hardness tester according to claim 3, wherein:

the image acquirer further acquires an image of the surface of the sample before the indentation is formed as a background image, and acquires an image of the surface of the sample after the indentation is formed as a measurement image, and the plurality of indentation region extractors includes:

a first indentation region extractor that extracts an indentation region based on a difference image for the background image and the measurement image;

a second indentation region extractor that divides the background image into a plurality of blocks and creating a histogram of brightness information for each of the divided blocks, dividing the measurement image into the plurality of blocks and, for each pixel in each of the divided blocks, referencing the histogram created at a block in the background image that corresponds to the block containing the pixel to determine the pixel's resemblance to the background image, and extracting the indentation region based on the results of the determination; and a third indentation region extractor that reduces the measurement image by a scale factor selected from among a plurality of predetermined scale factors to generate a reduced image, and that performs a pattern-matching process on the reduced image to extract the indentation region.

5. The hardness tester according to claim 4, further comprising, as a configuration when the processor executes the instruction stored in the memory:

a selector that selects, from among the plurality of indentation region extractors, an indentation region extractor that corresponds to a sample based on an image prior to formation of the indentation, acquired by the image acquirer.

6. The hardness tester according to claim 3, further comprising, as a configuration when the processor executes the instruction stored in the memory:

a selector that selects, from among the plurality of indentation region extractors, an indentation region extractor that corresponds to a sample based on an image prior to formation of the indentation, acquired by the image acquirer.

7. The hardness tester according to claim 2, wherein:

the image acquirer further acquires an image of the surface of the sample before the indentation is formed as a background image, and acquires an image of the surface of the sample after the indentation is formed as a measurement image, and the plurality of indentation region extractors includes:

a first indentation region extractor that extracts an indentation region based on a difference image for the background image and the measurement image;

a second indentation region extractor that divides the background image into a plurality of blocks and creating a histogram of brightness information for each of the divided blocks, dividing the measurement image into the plurality of blocks and, for each pixel in each of the divided blocks, referencing the histogram created at a block in the background image that corresponds to the block containing the pixel to determine the pixel's resemblance to the background image, and extracting the indentation region based on the results of the determination; and a third indentation region extractor that reduces the measurement image by a scale factor selected from among a plurality of predetermined scale factors to generate a reduced image, and that performs a pattern-matching process on the reduced image to extract the indentation region.

8. The hardness tester according to claim 7, further comprising, as a configuration when the processor executes the instruction stored in the memory:

a selector that selects, from among the plurality of indentation region extractors, an indentation region extractor that corresponds to a sample based on an image prior to formation of the indentation, acquired by the image acquirer.

9. The hardness tester according to claim 2, further comprising, as a configuration when the processor executes the instruction stored in the memory:

a selector that selects, from among the plurality of indentation region extractors, an indentation region extractor that corresponds to a sample based on an image prior to formation of the indentation, acquired by the image acquirer.

10. The hardness tester according to claim 1, wherein:

the image acquirer further acquires an image of the surface of the sample before the indentation is formed as a background image, and acquires an image of the surface of the sample after the indentation is formed as a measurement image, and the plurality of indentation region extractors includes:

a first indentation region extractor that extracts an indentation region based on a difference image for the background image and the measurement image;

a second indentation region extractor that divides the background image into a plurality of blocks and creating a histogram of brightness information for each of the divided blocks, dividing the measurement image into the plurality of blocks and, for each pixel in each of the divided blocks, referencing the histogram created at a block in the background image that corresponds to the block containing the pixel to determine the pixel's resemblance to the background image, and extracting the indentation region based on the results of the determination; and a third indentation region extractor that reduces the measurement image by a scale factor selected from among a plurality of predetermined scale factors to generate a reduced image, and that performs a pattern-matching process on the reduced image to extract the indentation region.

11. The hardness tester according to claim 10, further comprising, as a configuration when the processor executes the instruction stored in the memory:

a selector that selects, from among the plurality of indentation region extractors, an indentation region extractor that corresponds to a sample based on an image prior to formation of the indentation, acquired by the image acquirer.

12. The hardness tester according to claim 1, further comprising, as a configuration when the processor executes the instruction stored in the memory:

a selector that selects, from among the plurality of indentation region extractors, an indentation region extractor that corresponds to a sample based on an image prior to formation of the indentation, acquired by the image acquirer.

13. The hardness tester according to claim 1, wherein the plurality of indentation region extractors are arranged in a predefined execution hierarchy configured to execute the indentation region extraction process.

14. The hardness tester according to claim 1, wherein the predefined reference indentation condition is based on at least one of an indenter used and a test force.

15. At least one tangible, non-transitory computer-readable medium storing an executable set of instructions for operating a hardness tester that loads a predetermined test force and forms an indentation in a surface of a sample using an indenter, and that measures the hardness of the sample by measuring dimensions of the indentation, wherein the set of instructions, when executed by a computer processor, causes the computer processor to operate as:

an image acquirer that acquires an image of the surface of the sample before and after the indentation is formed;

a plurality of indentation region extractors that use mutually distinct methods, each indentation region extractor of the plurality of indentation region extractors configured to extract an indentation region based on the images acquired by the image acquirer;

a determiner that determines whether the indentation region extracted by the plurality of indentation region extractors matches a predefined reference indentation condition; and a hardness calculator that calculates the hardness of the sample based on an indentation region that is determined by the determiner to match the predefined reference indentation condition.

16. The at least one tangible, non-transitory computer-readable medium according to claim 15, wherein the plurality of indentation region extractors are arranged in a predefined execution hierarchy configured to execute the indentation region extraction process.

17. The at least one tangible, non-transitory computer-readable medium according to claim 15, wherein the predefined reference indentation condition is based on at least one of an indenter used and a test force.

* * * * *